Dec. 27, 1966  C. J. SMITH ET AL  3,294,391
SHOCK ABSORBER CONSTRUCTION
Filed Dec. 7, 1964
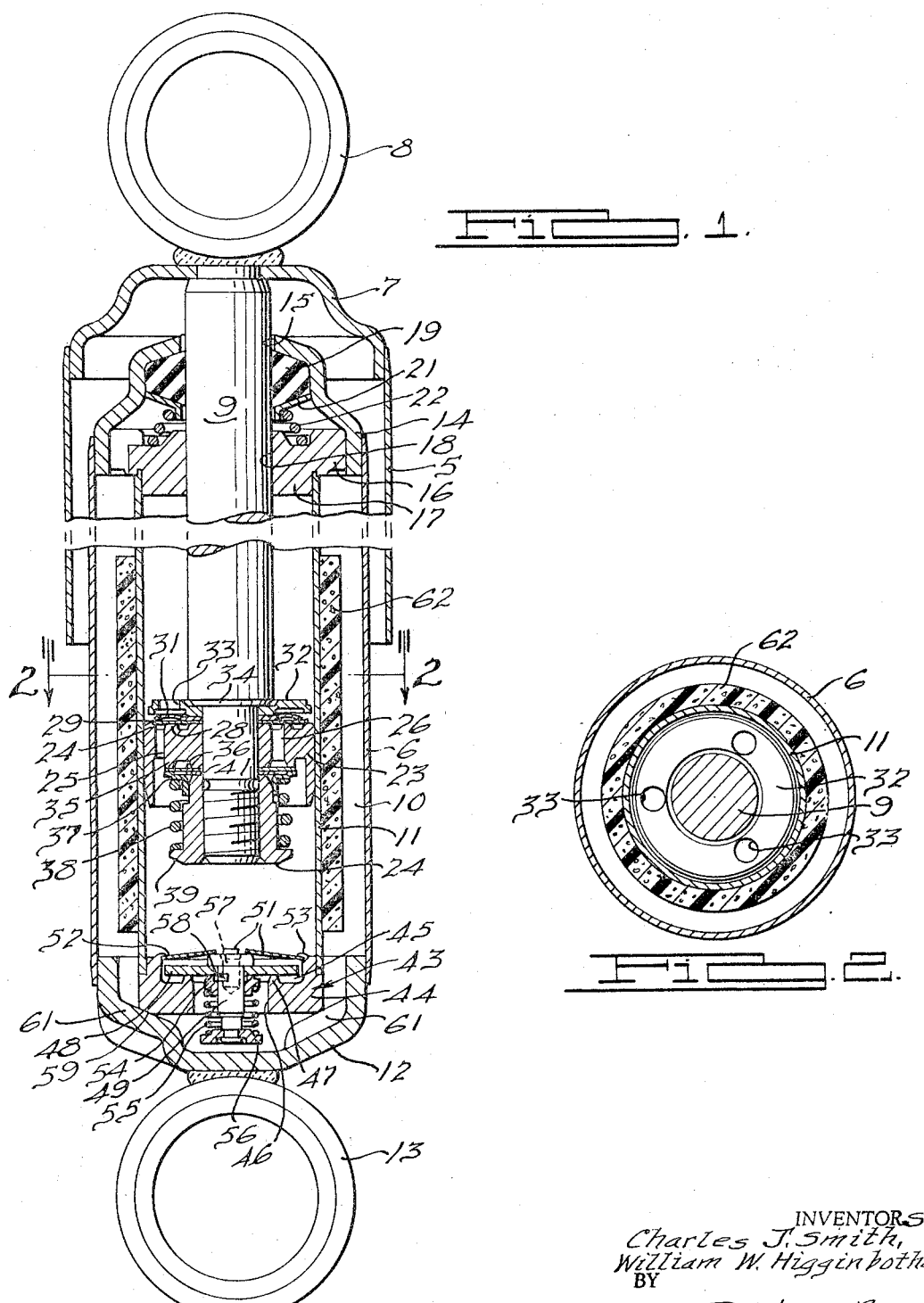
INVENTORS.
Charles J. Smith,
William W. Higginbotham,
BY
Harness, Dickey & Pierce
ATTORNEYS.

3,294,391
    SHOCK ABSORBER CONSTRUCTION
Charles J. Smith and William W. Higginbotham, Monroe,
  Mich., assignors to Monroe Auto Equipment Company,
  Monroe, Mich., a corporation of Michigan
        Filed Dec. 7, 1964, Ser. No. 416,475
            2 Claims. (Cl. 267—64)

This invention relates to hydraulic direct-acting shock absorbers and particularly to a shock absorber having pressure absorbing means within the reservoir thereof.

Shock absorbers for automotive vehicles and the like were provided with reservoirs for excess oil or other fluid having a head of air at the top thereof. This limits the application of the shock absorber to vertical and angular positions to the vertical, otherwise the air could move within the pressure cylinder and prevent the shock absorber from properly functioning. The present invention eliminates the head of oil and adds to the spring rate to the shock absorber by employing a sleeve of cellular elastomeric material about the pressure cylinder and within the reservoir area. Any pressure on the oil or the fluid moved into the reservoir compresses the elastomeric material and provides a spring effect to the fluid, while increasing the area of the reservoir for the admitted fluid. The compressibility of the material will vary for different size reservoirs and different types of shock absorbers and sufficient resiliency is always present to prevent the abrupt collapse of the elastomeric sleeve.

Accordingly, the main objects of the invention are: to provide a sleeve of elastomeric material about the pressure cylinder of a shock absorber within the reservoir thereof to be compressed by the pressure of the fluid admitted thereto; to provide a sleeve of elastomeric material within a reservoir having substantial resiliency to provide a spring rate to the oil or other fluid moved under pressure into the reservoir area; to provide elastomeric material within a reservoir which compresses under the pressure of oil or other fluid admitted thereto to increase the area of the reservoir and to apply a spring rate to the fluid in the system, and in general, to provide a shock absorber with pressure absorbing material within the reservoir area which is simple in construction, positive in operation and economical of manufacture.

Other objects and features and novelty of the invention will be specifically pointed out or will become apparent when referring for a better understanding of the invention to the following description taken in conjunction with the accompanying drawing, wherein:

FIGURE 1 is a sectional view of a shock absorber having a resilient sleeve in the reservoir area which embodies features of the present invention, and FIG. 2 is a sectional view of the structure illustrated in FIG. 1, taken on the line 2—2 thereof.

The shock absorber illustrated in the drawing is of a standard type except for the addition of the resilient sleeve in the reservoir area which takes the place of the air normally provided therein. The shock absorber is provided with telescoping tubes 5 and 6 which are movable longitudinally with respect to each other when the shock absorber is attached between the sprung and unsprung portion of a vehicle, or the like. The tubular section 5 has an end cap 7 secured to the upper end thereof on which a ring-like attaching element 8 is secured. A piston rod 9 has its upper end rigidly connected to the underside of the central portion of the cap 7 and depends therefrom into the cylindrical section 6, which is concentric with the section 5. A fluid reservoir 10 is formed outwardly of a pressure cylinder 11 which is concentric to the cylinder 6. The lower end of the tubular section 6 is closed by a cap 12, which is adapted to be connected to one portion of a vehicle by a suitable means, such as by a ring-like attaching member 13. The upper end of the tubular section 6 is closed by a cap 14 which is provided with a central aperture 15 through which the piston rod 9 extends.

The upper end of the pressure cylinder 11 is closed by a piston rod guide member 16 which has a reduced portion 17 extending within the pressure cylinder 11 and is secured in sealed relation thereto. The guide member 16 has a central aperture 18 which snugly fits the piston rod 9 as it operates therethrough. A rubber seal 19 surrounds the piston rod 9 and is confined within the upper portion of the end cap 14 by a retainer element 21 and a spring 22. A piston 23 is mounted on the lower shoulder end of the piston rod 9 secured thereon by a nut 24. The piston 23 has an outer set of anularly disposed apertures 25 extending therethrough and another set of annularly disposed apertures 26 located inwardly of the apertures 25. Annular valve seats 27 and 28 are provided on the top of the piston 23 engaged by a thin washer-like valve 29 for closing the passageway 25 when the piston rod 9 is moved upwardly. A spring disc 31 urges the washer valve 29 upon the annular seats 25 and 26. A washer 32 having a plurality of apertures 33 therein is disposed above the spring disc 31 against the shoulder 34 of the piston rod 9.

An annular valve seat 35 is disposed on the bottom of the piston 23 outwardly of the inner row of apertures 26 in engagement with a thin washer-like valve 36 which is urged against the valve seat 35 by a sleeve 37 which is slidable downwardly upon the nut 24 and urged upwardly by a spring 38 which bottoms on the outer flange 39 of the nut. A washer 41 is disposed between the end of the nut and the washer-like valve 36, all of which is tightened against the shoulder 34 by the nut 24. When the piston 23 is moved upwardly, fluid under pressure will move downwardly through the apertures 26 unseating the valve 36 to permit the fluid to pass into the area below the piston as it is moved upwardly by the rod 9.

The lower end of the pressure cylinder 11 has a compression valve assembly 43 which consists of a head 44 having a portion extending in the end of the cylinder 11 in secured sealed relation thereto. The head 44 has an enlarged recess 45 communicating with a central aperture 46 at the upper edge of which an annular valve seat 47 is provided. A washer-like valve 48 rests upon the seat 47 and is secured to a central rivet 49 which is urged downwardly by spring fingers 51 of a disc 52 which is secured in position by a coined edge 53 at the upper edge of the recess 45. The rivet has a slidable sleeve 54 urged upwardly by a spring 55 against the underside of the valve 48. The bottom end of the spring is supported by a washer 56, secured to the lower end of the rivet 49. The rivet has a central passageway 57 communicating with an outlet slot 58 which delivers fluid within the sleeve 54, which is moved downwardly thereby against the tension of the spring 55 to permit the fluid to pass from the lower end of the cylinder through the passageway 46 into the reservoir 10. The head 43 has notches 59 therein engaged by a plurality of embossed areas 61 in the cap 12 to secure the head in fixed relation therewith.

A sleeve 62 of elastomeric material is supported on the outer surface of the pressure cylinder 11 within the reservoir 10. The material has sufficient elasticity to prevent collapse and to provide a spring rate to the oil or other fluid within the reservoir which compresses the material as the quantity and the pressure on the fluid delivered to the reservoir increases. With this arrangement, the reservoir is completely filled with the oil or other fluid and cavitation of the fluid is entirely eliminated, permitting the shock absorber to be used in any position, horizontally, vertically, or in any angular positions therebetween.

Closed cell polyurethane foams of the resilient type which can be made from polyesters or polyethers with appropriate quantities of reactives to provide the optimum degree of resiliency, can successfully be employed. These materials will withstand the presence of oil without deterioration over long periods of time. Such materials will not collapse but will be compressed by the oil or other fluid as the volume and pressure of the fluid admitted to the reservoir increases. By compressing the material of the sleeve, a desired spring rate will be provided to the oil or other fluid adding to the smooth operation of the shock absorber.

The shock absorber functions in the usual manner, the upward movement of the piston 23 directing fluid through the orifice 26 thereof past the washer valve 33 into the lower portion of the pressure cylinder 11. When additional oil or other fluid is required to fill the area below the piston, because of the differential in the volume of the cylinder 11 above and below the piston due to the location of the piston rod 9 above the piston, the valve plate 59 will open and permit the fluid to be drawn from the reservoir and thereby maintain the lower portion of the cylinder full of fluid at all times. Upon a downward movement of the piston rod 9, the fluid in the lower portion of the cylinder will pass upwardly through the outer annular rows of apertures 25, past the thin valve 29 and into the upper portion of the pressure cylinder. Because of the presence of the piston rod 9 within the upper portion of the cylinder, pressure will build up in the lower portion as the piston moves downwardly. When this occurs, the oil or other fluid below the piston will pass through the aperture 57 in the rivet 49 and out through the slot 58 to force the sleeve 54 to move downwardly against the pressure of the spring 55 and thereby permit the fluid to pass into the aperture 46 and the reservoir 10. Such shock absorber operations are well known and will not be described further in detail.

As the fluid passes through the passageway 46 into the reservoir, the volume of the reservoir increases as the material of the sleeve 62 is compressed, the resiliency of the compressed material adding spring rate to the fluid in the system. Since there is no air in the reservoir, the material of the sleeve 62 must be compressed by the oil admitted to the reservoir to increase the volume thereof. Since there is no air in the fluid system within the pressure cylinder 11 or the reservoir 10, the shock absorber will operate properly in any position; horizontal, vertical, or any angular positions therebetween.

What is claimed is:

1. In a shock absorber, a pressure cylinder, a piston within the pressure cylinder, a piston rod on the piston, valves on the piston for controlling the flow of fluid through the piston from one or the other side thereof, a reservoir adjacent to said pressure cylinder, a valve between said pressure cylinder and reservoir for controlling the flow of fluid to and from the cylinder and reservoir and a tube of elastomeric material substantially the length of the pressure cylinder on the outer surface of which it is supported when located within said reservoir.

2. In a shock absorber, a pressure cylinder, a piston within the pressure cylinder, a piston rod on the piston, valves on the piston for controlling the flow of fluid through the piston from one or the other side thereof, a reservoir adjacent to said pressure cylinder, a valve between said pressure cylinder and reservoir, and a sleeve within said reservoir of a polyurethane foam material of the resilient type secured to the outer wall of said pressure cylinder over a substantial length therof.

References Cited by the Examiner
UNITED STATES PATENTS

| | | | |
|---|---|---|---|
| 2,618,089 | 11/1952 | Conway | 267—64 |
| 2,873,964 | 2/1958 | Hamilton | 267—64 |
| 2,982,538 | 5/1961 | de Carbon | 267—64 |
| 3,033,556 | 5/1962 | Wossner | 267—64 |
| 3,094,317 | 6/1963 | Axthammer | 267—64 |
| 3,194,355 | 7/1965 | Jeromson | 267—64 X |

ARTHUR L. LA POINT, *Primary Examiner.*

R. M. WOHLFARTH, *Assistant Examiner.*